United States Patent [19]

Wolf et al.

[11] Patent Number: 5,459,832

[45] Date of Patent: Oct. 17, 1995

[54] METHOD AND APPARATUS FOR EDITING GROUPS OF GRAPHIC IMAGES

[75] Inventors: Richard Wolf, Crowley; Todd A. Milburn, Fort Worth, both of Tex.

[73] Assignee: AST Research, Inc., Irvine, Calif.

[21] Appl. No.: 385,084

[22] Filed: Feb. 7, 1995

Related U.S. Application Data

[63] Continuation of Ser. No. 108,315, Aug. 18, 1993, abandoned.

[51] Int. Cl.⁶ .................................................. G06F 17/50
[52] U.S. Cl. ........................... 395/155; 395/157; 395/161
[58] Field of Search .................................... 395/155, 157, 395/158, 161, 154

[56] References Cited

U.S. PATENT DOCUMENTS 5,253,338  10/1993  Tanaka .................................... 395/161

OTHER PUBLICATIONS

Mastering of Wordperfect for Windows (Trademark of Sybex Inc.), 1992, pp. 636–640, 668–671 and attached sheets 1–5.

Primary Examiner—Heather R. Herndon
Assistant Examiner—Cliff N. Vo
Attorney, Agent, or Firm—Knobbe, Martens, Olson & Bear

[57] ABSTRACT

A subgroup object displayed by a drawing program in a window area as part of a more complex display can be edited by creating a new drawing area or "window" called a "zoom" window and reproducing the subgroup in the new drawing window. Within the zoom window, the subgroup object is effectively broken into its component objects, and the component objects can be individually manipulated using standard techniques. More particularly, the subgroup object is copied into the new window by copying the list of individual objects which comprise the subgroup object into the main group object list associated with the new window. As each individual object is redrawn in the new window, it is scaled and translated so that it appears in the same relative position in the new window as it did in the original window, but at a position and size relative to the new window. Thus, the new window appears to portray the original group object, but the new window actually contains a collection of individual objects which are not part of a subgroup. Thus, the objects can be individually manipulated using the standard drawing program tools.

25 Claims, 13 Drawing Sheets

1

METHOD AND APPARATUS FOR EDITING GROUPS OF GRAPHIC IMAGES

This application is a continuation of application Ser. No. 08/108,315, filed Aug. 18, 1993 now abandoned.

FIELD OF THE INVENTION

This invention relates, in general, to user interfaces to computer programs known as drawing programs and, more particularly, to apparatus and methods for modifying groups of graphical images manipulated by such programs.

BACKGROUND OF THE INVENTION

A type of computer program known as a drawing program has become available for many years on a variety of computers. This type of program allows a user to "draw" graphic images on a computer screen by manipulating a joystick, mouse, graphic pad or other input device. Once drawn on the screen, the image can be stored, printed, edited or manipulated by the computer (for example, scaling and coloring). More recently, "object-oriented" versions of such programs have become popular application programs. Examples of such programs include the Micrographics DRAW® program developed and distributed by Micrographics, Inc. and MICROSOFTWORKS DRAW® developed and distributed by Microsoft Corporation, Redmond, Wash.

Object-oriented drawing programs allow a user to create "objects" such as lines, squares, circles arcs, text, etc. The user can then manipulate these objects by changing the size, location, color, line weight, etc, so as to create a particular drawing. The resulting collection of graphical objects can be stored and printed to produce a final drawing. Many of these programs operate with graphical operating systems such as the WINDOWS® operating system developed and sold by Microsoft Corporation or the SYSTEM 7® operating system developed and sold by Apple Incorporated, Cupertino, Calif. These graphical operating systems allow the drawings to be made in one or more "windows", or rectangular drawing areas, on the display screen.

It is common practice in such drawing programs to allow the user to "group" or associate a plurality of simple objects into one group object by means of techniques well-known and understood in the art. The group object can then be manipulated by the drawing program as though it were a single entity. This grouping technique allows a complex picture to be constructed of simpler, but yet still complex parts. Each picture part can be either a simple object or a complex group object. In this way a picture of considerable detail and complexity can be constructed from a small set of fundamental objects. Standard building block or shapes can be created using this grouping technique, saved and utilized in many pictures. These reusable picture building blocks are commonly known as "clip art" and are commercially packaged and sold as such.

In the process of constructing a complex picture from simple and group objects it is often necessary to modify a preexisting group by changing some aspect of one or more of its component objects. This modification has been traditionally accomplished by "ungrouping" the group object or breaking the group into its constituent component objects. The component objects then can be individually manipulated.

The ungrouping technique has a drawback in that it is often difficult to reconstruct the group object after the modifications have been performed on the component objects. For example, there are two common techniques used to construct a group object. The first technique consists of selecting the group component objects by outlining an area (commonly a rectangle) that properly contains all of the component objects that are supposed to be in the group. After the desired objects are contained within the rectangle they are all selected by a conventional mechanism. The second method for forming a group is to individually select and add component objects one-by-one to the group object.

The first technique is often difficult to use when the drawing becomes complicated because it is difficult to place the rectangle around the desired objects without including other objects that are not intended to be included in the group. The second technique can be quite tedious if the group contains many objects.

Consequently, it is among the objects of this invention to simplify the editing or modification of group objects.

SUMMARY OF THE INVENTION

Briefly, an apparatus and method constructed in accordance with the invention provides a technique by which a new drawing area or "window" is created on the display and a subgroup object to be modified is reproduced into the new drawing window called a "zoom" window. Within the zoom window, the subgroup object is effectively broken into its component objects and the component objects can be individually manipulated using standard techniques.

More particularly, the subgroup object is copied into the new window by copying the list of individual objects which comprise the subgroup object into the main group object list associated with the new window. As each individual object is redrawn in the new window, it is scaled and translated so that it appears in the same relative position in the new window as it did in the original window, but at a position and size relative to the new window. Thus the new window appears to portray the original group object, but the new window actually contains a collection of individual objects which are not part of a subgroup. Thus, the objects can be individually manipulated using the standard drawing program tools.

If one or more of the component objects is also a group object, the process may be repeated on that group object as desired by opening another drawing window and copying that object into the new additional window. When the user is finished with the manipulation of the component objects which comprise a group, the zoom window is closed or removed from the screen and, since the individual objects have been modified, when the underlying window is redrawn, the group object appears in the underlying window in the original position and size, but with the modifications performed in the zoom window.

The zoom window can also be enlarged so as to give the user more detailed control over the individual component objects or can remain at the size and position of the original group. The former case is called "zooming" because of the analogy with a zoom camera lens and lends the name "zoom" window to the new drawing area. Zooming is accomplished by applying appropriate scaling and translation routines to the component objects as they are being copied to the zoom window. The latter case is termed "editing in place" because the component objects are in the same relative position within the zoom window as they were within the original window. The term "zoom window" will be used to describe the new window in either case for simplicity

BRIEF DESCRIPTION OF THE DRAWINGS

The above and further advantages of the invention may be better understood by referring to the following description in conjunction with the accompanying drawings, in which.

DETAILED DESCRIPTION OF THE ILLUSTRATIVE EMBODIMENTS

Figure 1:
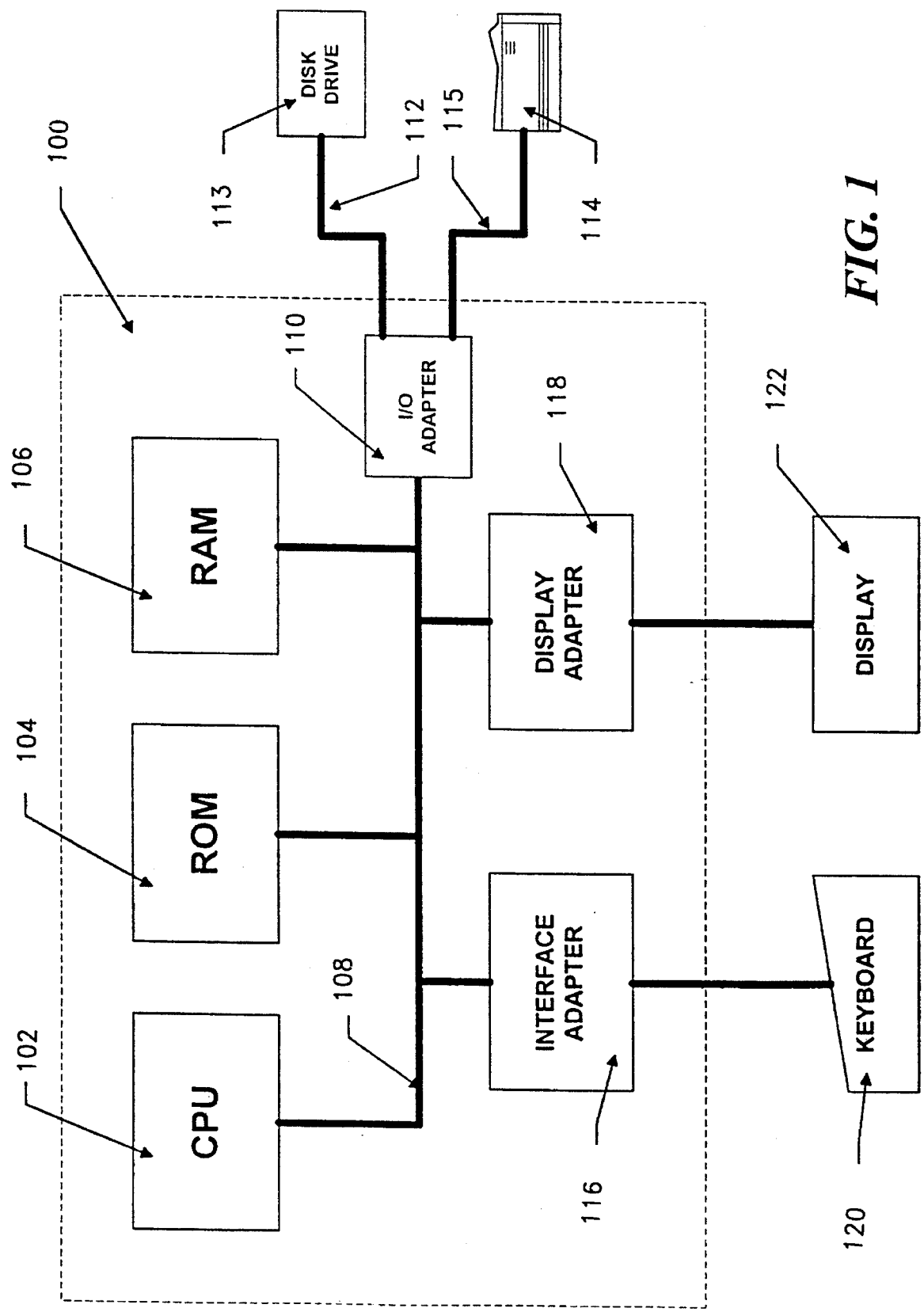
FIG. 1 is a block schematic diagram of an illustrative computer system on which the present invention can operate.

The invention is preferably practiced in the context of an operating system resident on a personal computer such as an IBM PS/2® or compatible computer. A representative hardware environment is depicted in FIG. 1, which illustrates a typical hardware configuration of a computer 100 in accordance with the subject invention. The computer 100 is controlled by a central processing unit 102, which may be a conventional microprocessor; a number of other units, all interconnected via a system bus 108, are provided to accomplish specific tasks. Although a particular computer may only have some of the units illustrated in FIG. 1 or may have additional components not shown, most computers will include at least the units shown.

Specifically, computer 100 shown in FIG. 1 includes a random access memory (RAM) 106 for temporary storage of information, a read only memory (ROM) 104 for permanent storage of the computer's configuration and basic operating commands and an input/output (I/O) adapter 110 for connecting peripheral devices such as a disk drive 113 and printer 114 to the bus 108, via cables 115 and 112, respectively. A user interface adapter 116 is also provided for connecting input devices, such as a keyboard 120, and other known interface devices including mice, speakers and microphones to the bus 108. Visual output is provided by a display adapter 118 which connects the bus 108 to a display device 122, such as a video monitor. The workstation has resident thereon and is controlled and coordinated by operating system software such as the MICROSOFT MS-DOS® operating system sold by Microsoft Corporation, Redmond, Wash.

In the illustrative embodiment discussed below, the inventive graphics management system is designed to operate with the Microsoft WINDOWS® version 3.1 operating system which is an overlay to the MS-DOS operating system, although other operating systems and interfaces can also be used without departing from the spirit and scope of the present invention. The WINDOWS operating system provides the common operating system and user interface components used for menu management and input device operation and is a widely known and understood environment. Accordingly, the inventive graphics management system has been implemented as a Microsoft WINDOWS Application and runs as a task within this environment.

Since the Microsoft WINDOWS operating system is well-known, it will not be discussed in detail herein. However, some basic explanation will serve to clarify the operation of the inventive graphics management system. Specifically, application programs running within the WINDOWS environment do not directly access the system resources such as the display, the printer, the mouse or the keyboard. Instead, applications communicate with the WINDOWS operating system by means of pre-defined "messages" which can be generated either by the WINDOWS system or by the application program. The WINDOWS operating system then controls the system resources to carry out the requested task. For example, messages may be generated by the WINDOWS operating system in response to a menu selection, mouse movement, mouse button positions ("button up" and "button down" messages) and operation of keys on the keyboard. Alternatively, an application program can generate messages to cause information to be displayed on the screen, stored on disk or sent to the printer. The WINDOWS operating system also provides common system resources such as resizable windows in which information is displayed and input devices such as dialog boxes containing various user operable "controls" such as pushbuttons, list boxes, combo boxes and check boxes.

In addition, within the Microsoft WINDOWS environment, much of the application control processes which are normally found in the application program are instead implemented within the WINDOWS system itself. Consequently, application programs which operate in the WINDOWS environment do not have a continuous control structure, but instead consist of a set of message response functions, one of which is selected in response to a message received from the operating system by a "switch" statement. Therefore, in the following discussion, the inventive graphics management system will be described by discussion of selected message response functions. The interaction with the WINDOWS operating system will not be described in detail since this is conventional and well-known. However, the terms "window", "parent window", "button", and "message" will be used as defined by the Microsoft WINDOWS 3.1 documentation including the Software Developers Kit (SDK) documentation.

In addition, as previously mentioned, many graphics programs are "object-oriented" and, accordingly, the inventive routines are preferably programmed using an "object-oriented" programming language such as the C++ programming language using object-oriented programming techniques. C++ is a compiled language, that is, programs are written in a human-readable script and this script is then provided to another program called a compiler which generates a machine-readable numeric code that can be loaded into, and directly executed by, a computer. As described below, the C++ language has certain characteristics which allow a software developer to easily use programs written by others while still providing a great deal of control over the reuse of programs to prevent their destruction or improper use. The C++ language is well-known and many articles and texts are available which describe the language in detail. In addition, C++ compilers are commercially available from several vendors including Borland International, Inc. and Microsoft Corporation. Accordingly, for reasons of clarity, the details of the C++ language and the operation of the C++ compiler will not be discussed further in detail herein.

As will be understood by those skilled in the art, Object-Oriented Programming (OOP) techniques involve the definition, creation, use and destruction of "objects". These objects are software entities comprising data elements and routines, or functions, which manipulate the data elements. The data and related functions are treated by the software as an entity and can be created, used and deleted as if they were a single item. Together, the data and functions enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or, in the case of the present invention, graphical object. Objects may be used by using their data and invoking their functions.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the data variables and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, during compilation, the C++ compiler will determine which of the three functions is actually being used by examining the variable types. The compiler will then substitute the proper function code. Polymorphism allows similar functions which produce analogous results to be "grouped" in the program source code to produce a more logical and clear program flow.

The third principle which underlies object-oriented programming is inheritance, which allows program developers to easily reuse preexisting programs and to avoid creating software from scratch. The principle of inheritance allows a software developer to declare classes (and the objects which are later created frown them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

Objects are defined by creating "classes" which are not objects themselves, but which act as templates that instruct the compiler how to construct the actual object. A class may, for example, specify the number and type of data variables and the steps involved in the functions which manipulate the data. An object is actually created in the program by means of a special function called a constructor which uses the corresponding class definition and additional information, such as arguments provided during object creation, to construct the object. Likewise objects are destroyed by a special function called a destructor. Objects may be used by using their data and invoking their functions.

Although object-oriented programming offers significant improvements over other programming concepts, program development still requires significant outlays of time and effort, especially if no preexisting software programs are available for modification. Consequently, a prior art approach has been to provide a program developer with a set of pre-defined, interconnected classes which create a set of objects and additional miscellaneous routines that are all directed to performing commonly-encountered tasks in a particular environment. Such predefined classes and libraries are typically called "application frameworks" and essentially provide a pre-fabricated structure for a working application.

For example, an application framework for a user interface might provide a set of pre-defined graphic interface objects which create windows, scroll bars, menus, etc. and provide the support and "default" behavior for these graphic interface objects. Since application frameworks are based on object-oriented techniques, the pre-defined classes can be used as base classes and the built-in default behavior can be inherited by developer-defined subclasses and either modified or overridden to allow developers to extend the framework and create customized solutions in a particular area of expertise. This object-oriented approach provides a major advantage over traditional programming since the programmer is not changing the original program, but rather extending the capabilities of the original program. In addition, developers are not blindly working through layers of code because the framework provides architectural guidance and modeling and, at the same time, frees the developers to supply specific actions unique to the problem domain.

There are many kinds of application frameworks available, depending on the level of the system involved and the kind of problem to be solved. The types of frameworks range from high-level application frameworks that assist in developing a user interface, to lower-level frameworks that provide basic system software services such as communications, printing, file systems support, graphics, etc. Commercial examples of application frameworks include MacApp (Apple), Bedrock (Symantec), ObjectWindows Library or OWL (Borland), NeXT Step App Kit (NEXT), and Smalltalk-80 MVC (ParcPlace). For the purposes of the illustrative embodiment described below, use of the Borland OWL applications framework is assumed. It should be understood however, that the invention is not limited to implementation within the Microsoft WINDOWS environment but could be implemented within any similar environment. Similarly, the invention need not use the Borland OWL applications framework.

Figure 2:
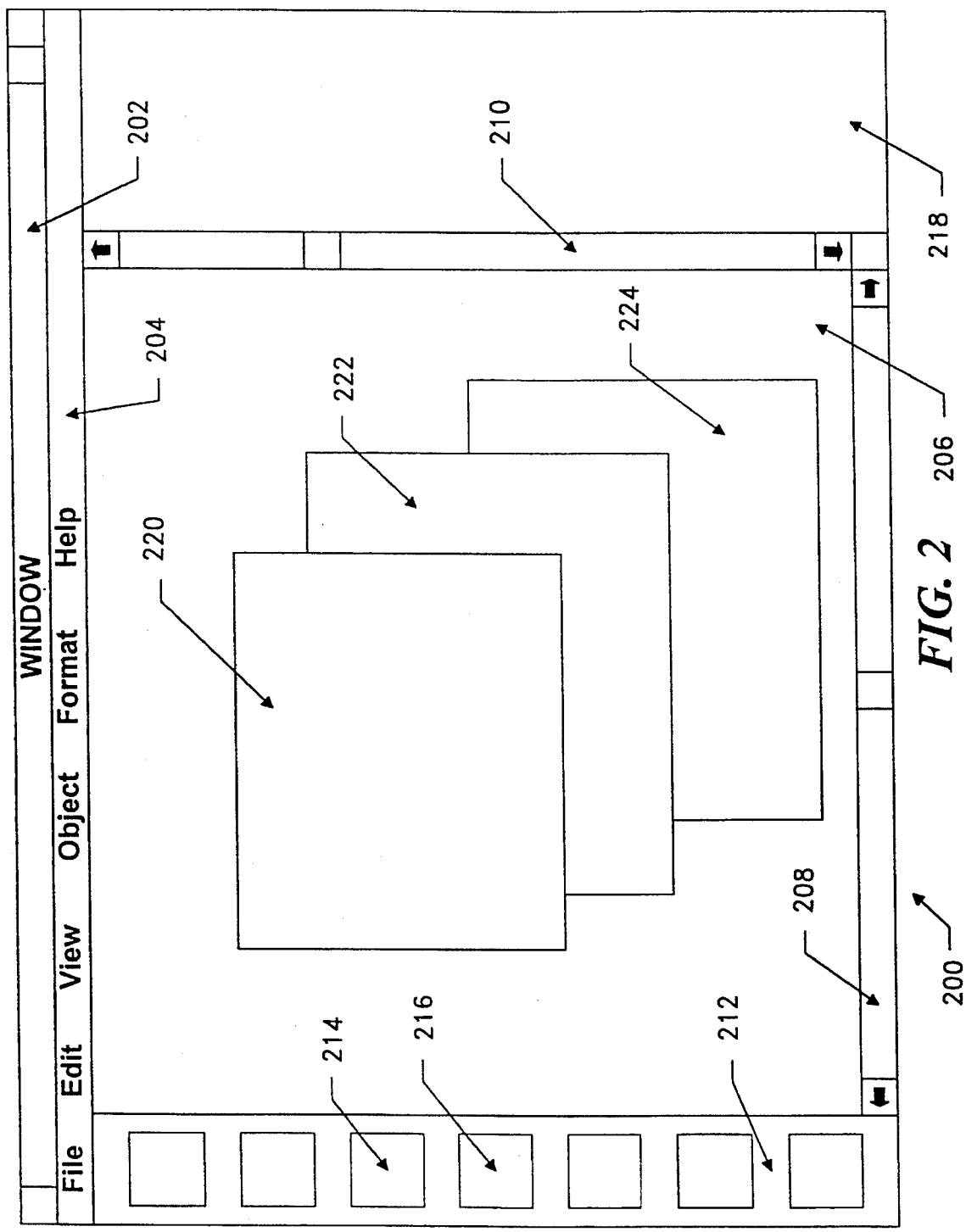
FIG. 2 is a schematic illustration of a typical display screen generated by a conventional window-oriented drawing program including the main window and additional windows.

FIG. 2 shows an illustrative screen display generated by a typical drawing program. When such a drawing program is used in a WINDOWS environment, the drawing area is enclosed in rectangular area defined by borders called a "window" 200. This window is normally called the "main" or "pop-up" window because it initially appears when the application begins to run, and, in accordance with normal WINDOWS operation, the main window can be moved and resized in a conventional manner. The window usually includes a title bar 202 and a menu bar 204. The menu bar allows access to a number of pull-down menus that are operated in a well-known manner and allow the user to operate various file, editing and other commands.

Within the main window, the area remaining after excluding the title bar, the menu bar and the borders is called the "client" area and constitutes the area that can be modified by an application program such as a drawing program. A client area may enclose additional windows called "child" windows that are associated with the main window. In this case the main window is called a "parent" window in relation to the child windows. Each child window may also have one or more child windows associated with it for which it is a parent window and so on.

Most drawing programs further sub-divide the client area into a number of child windows. These typically include a document window 206, a "toolbar" or "palette" window 212, and, in some cases, a control window 218. The document window 206 which may be equipped with horizontal and vertical scroll bars, 208 and 210, that allow objects in the document window to be moved on the screen. As used herein, the term "document" means a file which may contain text, graphics or both. The document window 206 may be further sub-divided into child windows which, in accordance with normal WINDOWS operation, may overlap each other. At any given time usually only one of the child windows is active or has input "focus". Only the window which has input focus responds to input actions and commands. Such windows are schematically shown as child windows 220, 222 and 224.

The toolbar/palette window usually contains a number of iconic images, such as icons 214 and 216, which are used as a convenient way to initiate certain, often-used drawing routines. For example, icon 214 may be selected to initiate a drawing routine which draws a box on the screen, whereas icon 216 might represent a drawing routine that draws a circle on the screen. The operation of such toolbars and palettes is generally well-known and will not be described further herein.

Some main windows also contain a control window 218, which may contain additional menus, buttons or other control elements that allow further drawing routines to be run. Such controls are generally selected by means of a mouse or other input device.

Figure 3A:
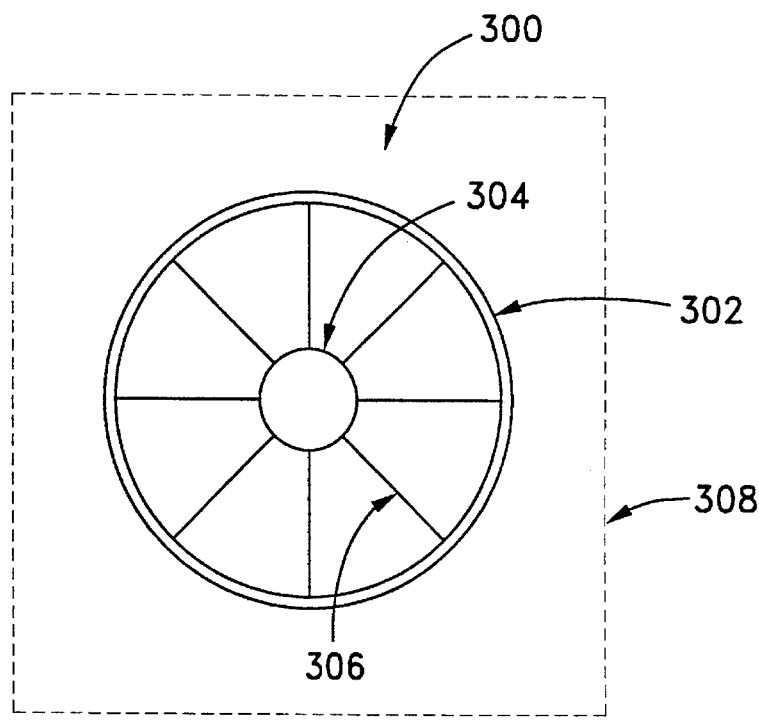
FIGS. 3A and 3B are a block schematic diagrams illustrating a group object comprised of a plurality of simpler objects and the same group object embedded in a more complex drawing
Figure 3B:
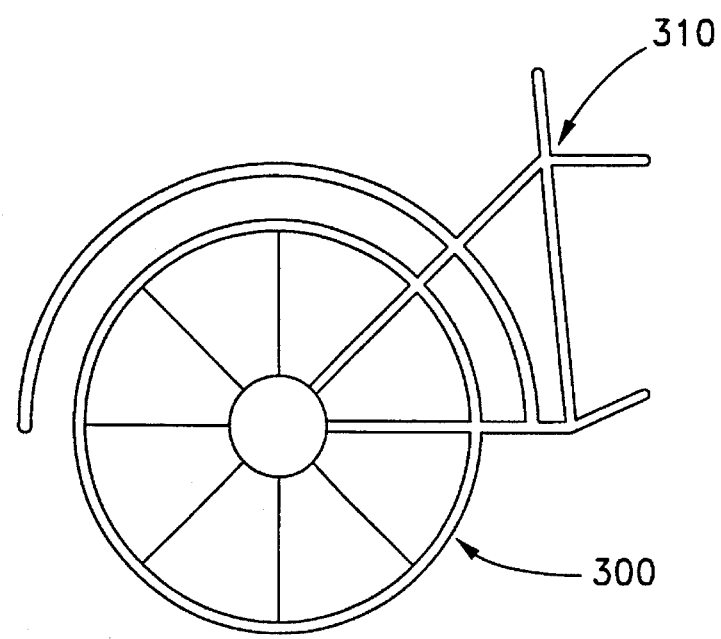

FIGS. 3A and 3B illustrate a typical problem that occurs when a drawing program that uses a screen display, such as that shown in FIG. 2, is utilized to construct complex objects. In the discussion of this figure and the following figures, the term "image" and the "object" that generates the image are used interchangeably. In particular, FIG. 3A shows a complex object which may illustratively be a "bicycle" wheel. The object 300 consists of a "rim" 302, which is illustrated as a heavy lined circle, a "hub" 304, illustrated as a filled circle, and a number of "spokes" 306, which are illustrated as straight lines. Such an object is generally constructed by first constructing each of the separate component objects 302, 304 and 306 and then sizing and positioning the separate component objects to form the overall complex object.

After the complex image has been constructed from each of the component images, it can be designated as a "group" or the component objects can be formed into a group object. Once the group object has been constructed, it can then be treated as a single entity and drawing commands such as moving and resizing can be applied to the group as a unit. The formation of a group is normally accomplished by selecting each of the component objects one-by-one and then issuing a "group" command. Alternatively, and more conveniently, most drawing programs allow a group to be constructed by placing a "selection box" schematically shown as box 308 around the desired collection of component objects 302, 304 and 306. The objects are then automatically selected by virtue of being inside the selection box. The group is then formed by choosing a "group" command from the menu or using a mouse or other input device to select a button or icon corresponding to the grouping operation.

A group can itself be a component object of another, more complex group. This "nested" grouping capability allows implementation of the graphic grouping technique by simply replacing each of the component objects to be included in a group with a group containing the objects (suitably scaled). Groups which are contained within another group are called "subgroups".

Such a grouping operation works well when the component objects are positioned by themselves on the display area and the selection box can easily be placed around the desired component objects. However, when the complex group object is subsequently incorporated into another, more complex, drawing, it becomes difficult to select particular component objects without including other undesired objects. Such a situation is shown in FIG. 3B, in which the complex group or "wheel" object 300 is included into a more complicated drawing including portions of a "bicycle" 310. In this case, portions of the bicycle overlap the complex wheel group object and thus it is not possible to place a rectangular box around the wheel group object without including unwanted portions of the bicycle object. Thus, if it is desired to resize or to edit the wheel group object, it is necessary to select the wheel group object and portions of the bicycle object, which latter portions then must be removed prior to editing. Alternatively, the wheel object can be "ungrouped", removed piece-by-piece, and reassembled away from the bicycle object. In either case, the component objects tend to get scattered and it may be difficult and tedious to reassemble them after the group object has been edited.

Figure 4:
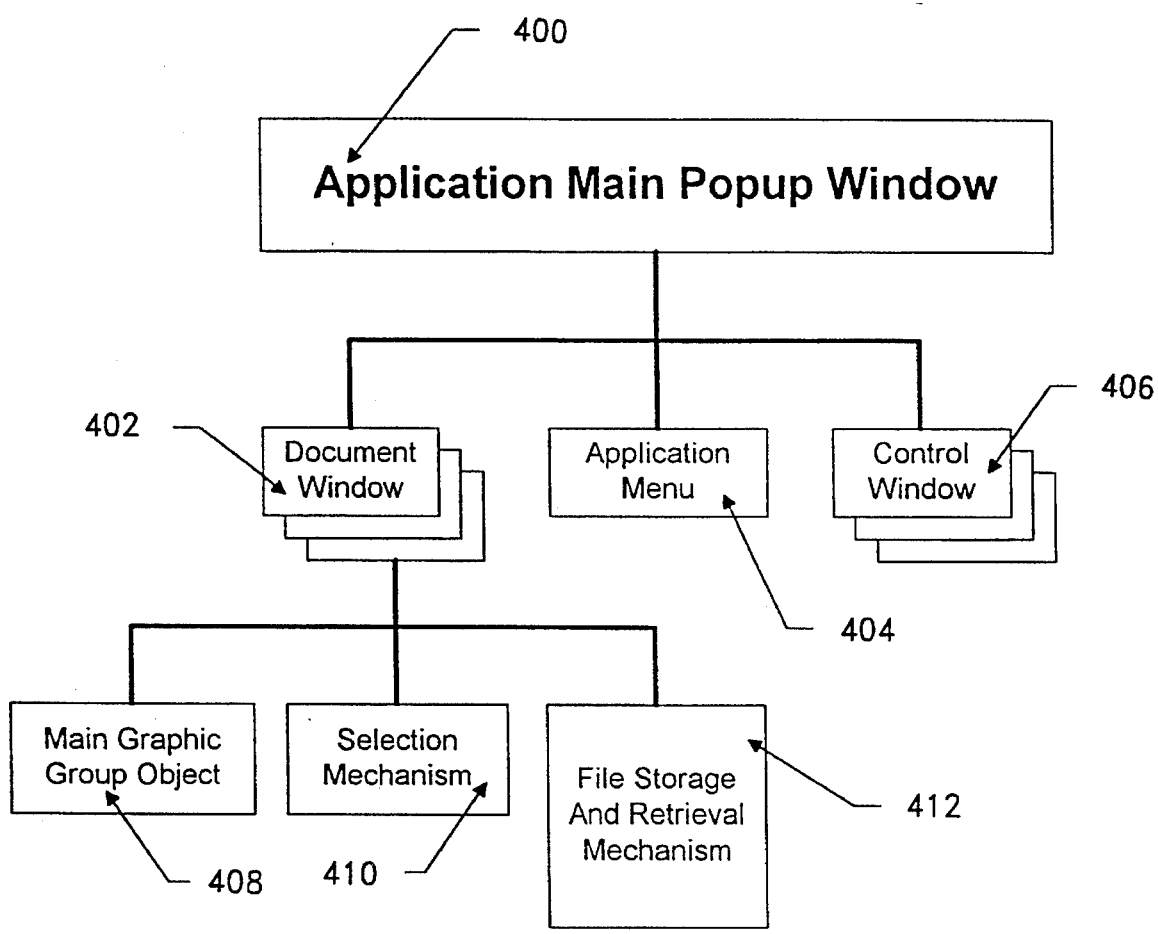
FIG. 4 is a block schematic diagram of the various components which comprise the main pop-up window of an application and the various components which comprise a document window.

In contrast with the prior art arrangement in which the objects must be "ungrouped" prior to editing, the present invention allows the group to be edited and then appear in the original drawing with the edited features. More particularly, FIG. 4 shows the basic parts which comprise a main or pop-up window schematically illustrated as box 400 in FIG. 4. The window consists of three components including one or more document windows 402 (corresponding to windows 206, 220, 222 and 224 in FIG. 2), an application menu 404 (corresponding to menu bar 204 in FIG. 2), and one or more control windows 406 (window 218).

Each document window 402, in turn, is comprised of three main components. These include a main graphic group 408, a selection mechanism 410, and a file storage and retrieval mechanism 412. Within the example implementation discussed herein, all objects drawn within a window are contained with a graphic group that is associated with the window. The graphic group is a collection of graphic objects each having certain properties such as size, position, shape (the detailed way that the object is drawn) etc. When a move or resize command is received by the WINDOWS operating system from the user, the WINDOWS operating system issues a WM_PAINT message to the window to cause it to redraw itself at a new location and size. When the WM_PAINT message is sent to a window, the window, in turn, requests that its associated graphic group redraw itself within the window. The graphic group, in turn, requests that each contained graphic object redraw itself. The group constrains its component objects to draw themselves correctly within the area of the window by using a mapping transformation which is predefined by the WINDOWS operating system.

Generally, the graphic objects included in the main graphic group 408 can be individually manipulated by means of the toolbar (212), the application menu commands (204), or the additional commands found in the control window (218). However, in typical drawing programs, a group object included in the main graphic group 408 cannot be directly edited by means of the toolbar, main menu or control window commands without first "ungrouping" the object and returning the component objects individually to the main graphic group.

Each document window also includes a selection mechanism 410, which may consist of a mouse cursor, a rectangular box or some other means for selecting one or more graphic objects depicted in the document window. Typically, the selected object changes in some manner to indicate that it has been selected. For example, "handles" may appear on the object, it may be drawn on a different color or with heavier outlines or the object may be indicated as selected in some other conventional manner. Also included in each document window 402, is a file retrieval and storage mechanism 412, which is used to load previously-stored image files into the document window display area frown a mass storage device and to store objects created during the operation of the drawing program.

Figure 5:
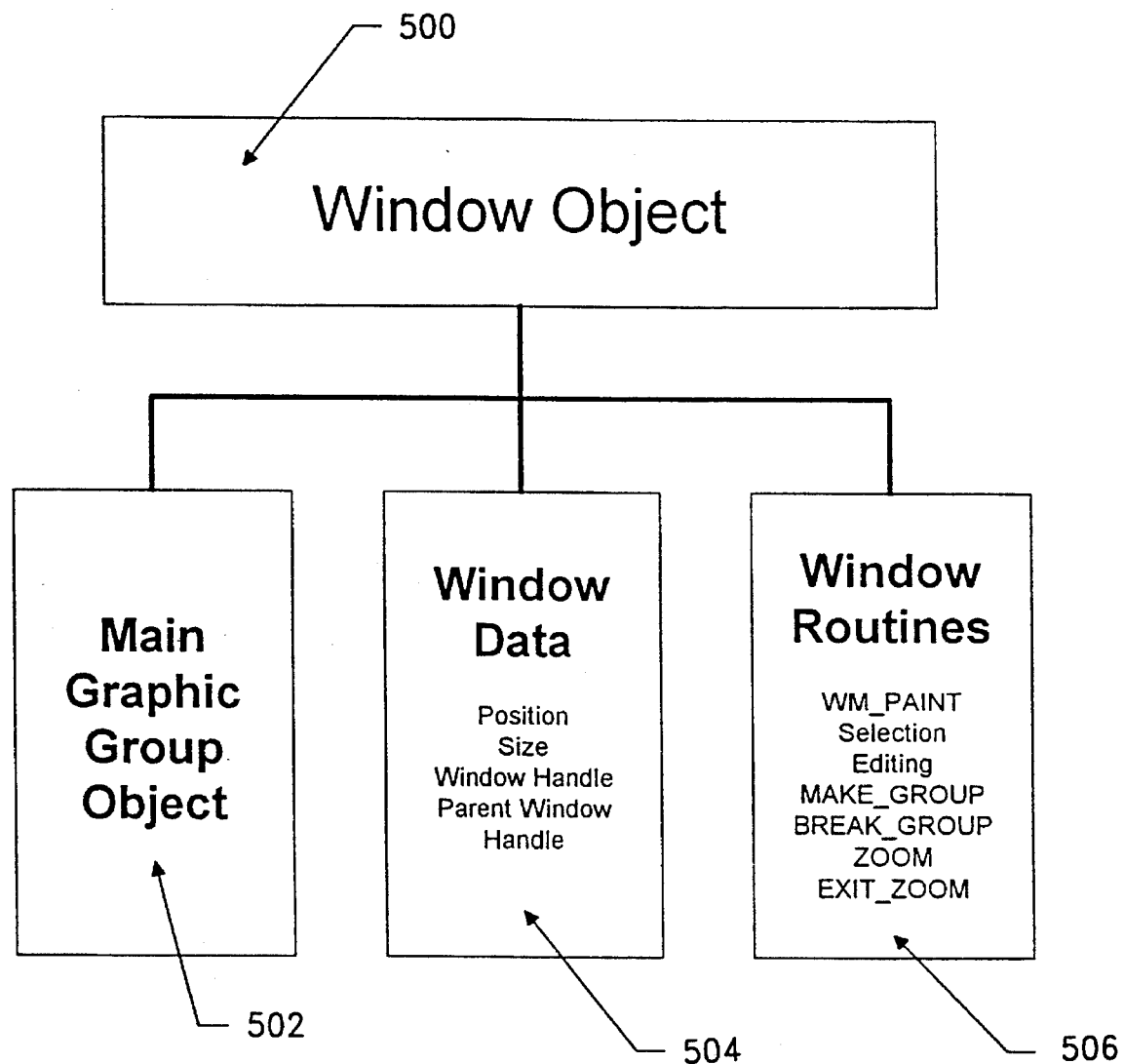
FIG. 5 is a block schematic diagram of the various components which comprise a window object.

In accordance with the "object-oriented" design of many drawing programs, each of the windows, including the main pop-up window 400, the document windows 402, and the control windows 406, is designed as a "object" which includes both data and routines for manipulating that data. The three main components of a typical window object 500 are shown in FIG. 5 and include a main graphic group object 502, window data 504, and window routines 506.

The main graphic group object 502 includes a list of all the graphic objects whose images are displayed on the associated document window display area. As previously mentioned, each graphic group object has the capability (provided by means of included functions) of resizing itself and redrawing itself on the screen at a new size and a different location.

The window data 504, comprises various data variables which are dependent on the environment in which the window is created. In the Microsoft WINDOWS operating system where each window consists of a rectangular area, window data typically includes information such as the position of the window in the display area (generally indicated by the position of the upper left hand corner of the rectangular window) and the size of the window (indicated by the horizontal and vertical extents). Window data may also include a window "handle" which is a number that is used to uniquely refer to a particular window and the handle of any parent window if one exists Window routines 506, also are dependent on a particular implementation and operating system environment. These typically include a variety of routines which are used to manipulate both the window itself and the graphic objects displayed in the window display area. These routines may include, for example, a WM_PAINT routine which, as previously mentioned, causes the window to redraw itself on the screen in response to a WM_PAINT message received from the WINDOWS operating system. The window routines may also include a selection routine, which, as previously mentioned, can be used for selecting one or more graphic objects displayed in the window display area and editing routines which allow component objects to be edited. The selection and editing routines are conventional and are not described further hereinafter.

Windows that deal with group objects typically include routines such as a MAKE_GROUP routine which allows selected graphic objects to be combined into a "group" as previously described. Illustratively, the MAKE_GROUP routine forms a group by creating a group list and adding graphic objects to the list. The list is then added to the main graphic group so that it appears as a graphic component object. An illustrative MAKE_GROUP routine will be discussed further hereinafter in detail.

Also included in most window objects is a BREAK_GROUP routine which allows a graphic group object to be "ungrouped". In general, this latter routine removes graphic objects from a group list and returns them to the main graphic group. It will also be discussed further hereinafter in detail.

In accordance with one aspect of the invention, window routines 506 also include ZOOM and EXIT_ZOOM routines. The ZOOM routine allows an existing group object to be reproduced in a "zoom" window for editing of the individual components and will be further discussed in detail hereinafter. The EXIT_ZOOM routine causes the component objects in a zoom window to be returned to the main graphic object after the modifications are carried out within the zoom window and then deletes the zoom window. The EXIT_ZOOM routine will also be discussed further hereinafter.

Figure 6:
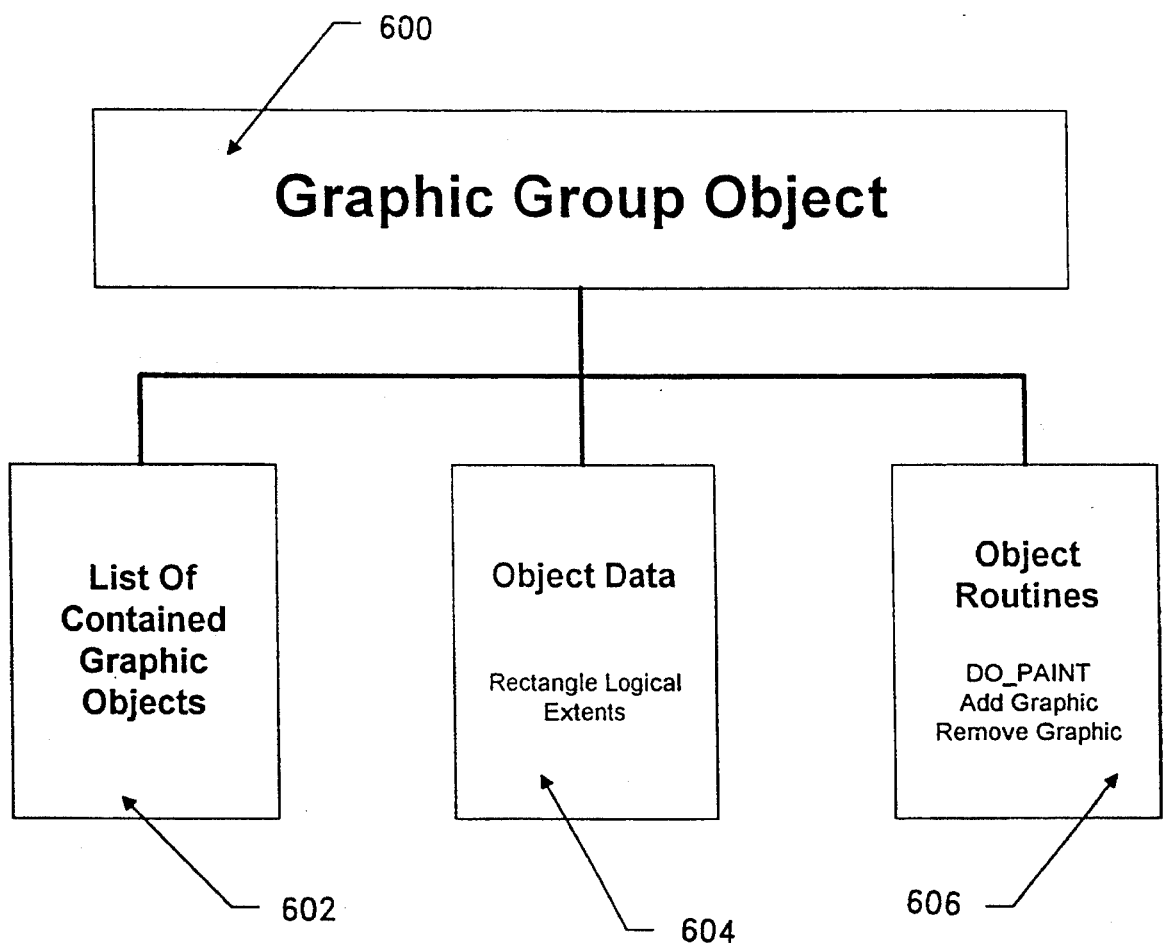
FIG. 6 is a block schematic diagram of the various components which comprise a graphic group object.

The MAKE_GROUP routine discussed in connection with the window object routines 506, creates a graphic group object which is shown schematically in FIG. 6. The graphic group object, 600, consists of three main components: a list of contained graphic objects 602, object data 604, and object routines 606.

The list of contained graphic objects 602 may contain instances of each component graphic object which is included within the group, but more often the list contains pointers to each of the component graphic objects in the graphic group object. List 602 may be illustratively implemented as a double-linked list, although other implementations may also be used without departing from the spirit and scope of the invention.

Each graphic group object 600 also contains object data 604 that typically includes the logical extents of a rectangle which surrounds the group. Within this rectangle, the associated group has its own coordinate system and its own display parameters, such as aspect ratio. This data allows the group to be manipulated independently of the other graphic objects in the display area.

Each graphic group object 600 also includes a number of routine 606, which may illustratively comprise a DO_PAINT routine which causes the group to redraw itself in response to a WM_PAINT message received from the associated window. Additional routines, such as an add graphic routine and remove graphic routine, are used to add component graphic objects and remove component graphic objects from the list of contained graphic objects 602. The graphic group object routines 606, are described further hereinafter in detail.

Figure 7:
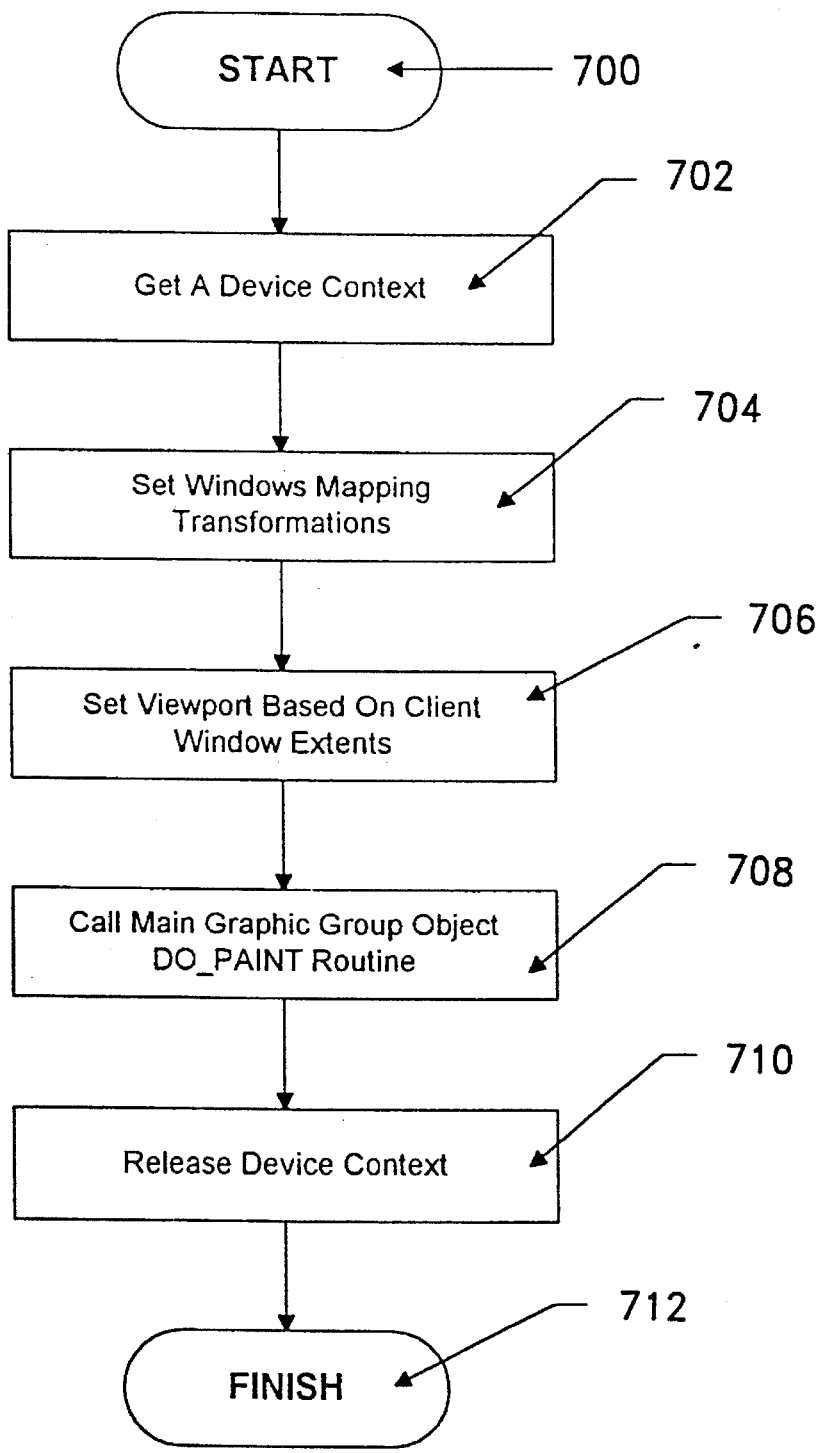
FIG. 7 is a flowchart of an illustrative routine used by a window object to process a WM_PAINT message.

FIGS. 7–12 disclose illustrative routines used by the various objects to respond to incoming messages. More specifically, FIG. 7 is a flowchart showing the steps in an illustrative routine utilized by a window object to process a WM_PAINT message. As previously mentioned, the WM_PAINT message causes the window to redraw itself and its contents. The illustrative routine begins in step 700 and proceeds to step 702 in which a request is made to the WINDOWS operating system to obtain a "device context".

It is a characteristic of the WINDOWS operating system that an application program cannot directly interface with any of the system resources, including the display screen, printers, modems, etc. Instead, the application program communicates with the WINDOWS operating system by means of a standard device-independent interface called a "device context". The device context is a data structure consisting of a number of predefined variables which are then used by the WINDOWS operating system to control the various system resources. The WINDOWS operating system contains the necessary device drivers and conversion programs which convert the standard interface variables into the variables needed to operate each of the separate system resources. Thus, an operation in which application program must effectively control one of the system resources begins when the application requests a device context from the windows operating system. The device context is obtained from the WINDOWS operating system by means of a predefined function which is called by the application program and the function returns a handle to the device context data structure.

Other standard steps which are included in the protocol for interfacing with the WINDOWS operating system (for example, BEGIN_PAINT commands and other known commands) are omitted from the discussion below for clarity. The actual variables used in the device context and the interface protocol are described in detail in the WINDOWS Software Developer's Kit documentation and will not be discussed further herein.

Once a device context has been obtained in step 702, the routine proceeds to step 704 in which the windows mapping transformations contained within the device context are set to the particular needs of the application program. In particular, the WINDOWS operating system offers a number of different mapping transformations which determine how the logical coordinates generated by the application program are translated into the physical coordinates utilized by the system resources. A mapping transformation is selected by calling a mapping mode function which is part of the WINDOWS operating system. The mapping mode function and the predefined mapping modes which are part of the WINDOWS operating system are also described in detail in the Microsoft Software Developers Kit documentation.

After the mapping transformations in the device context have been set in step 704, the routine proceeds to step 706 in which the "viewport" in the device context is set to the "client" extents. In particular, the viewport is the section of the windows display area that will be effected by the repainting routine. The viewport is generally determined by an "origin" which comprises the position of the upper left hand corner of a rectangular area, and by the logical extents which are the horizontal and vertical extents of the rectangular area. Generally, the viewport is set to the location and size of the window's client area.

After the viewport has been set in step 706, the routine proceeds to step 708 where the DO_PAINT routine of the main graphic group is called. This routine is explained in detail hereinafter and causes each component graphic object to redraw itself in the window display area.

The routine then proceeds to step 710 in which the device context is "released". This release is performed by calling a Release Device Context function provided by the WINDOWS operating system and the release informs the operating system that the window has completed its redrawing in response to the WM_PAINT message. The window WM_PAINT routine then finishes in step 712.

Figure 8A:
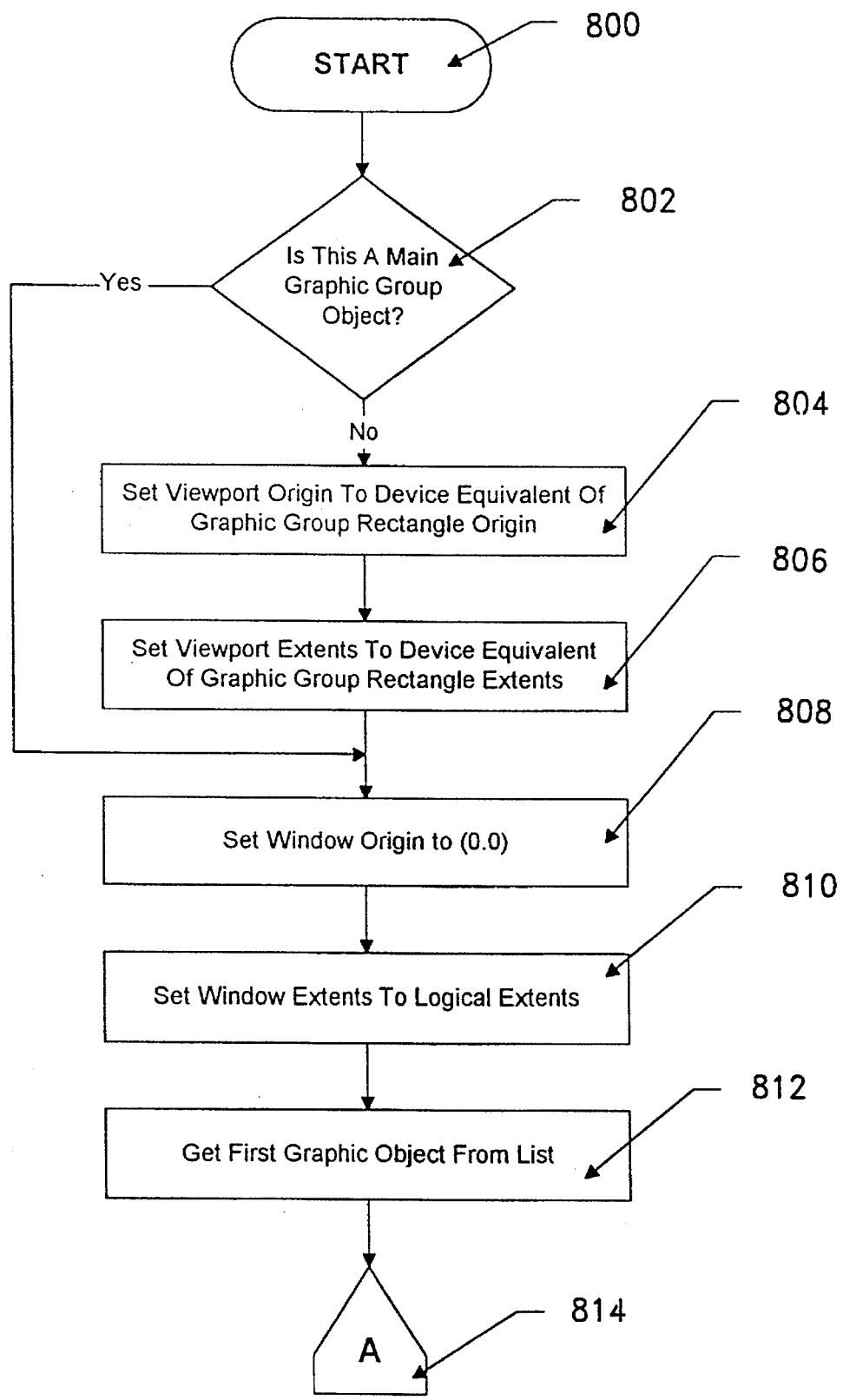
FIGS. 8A and 8B are two parts of a flowchart which when placed together illustrate a routine used by a graphic group object to process a DO_PAINT message.
Figure 8B:
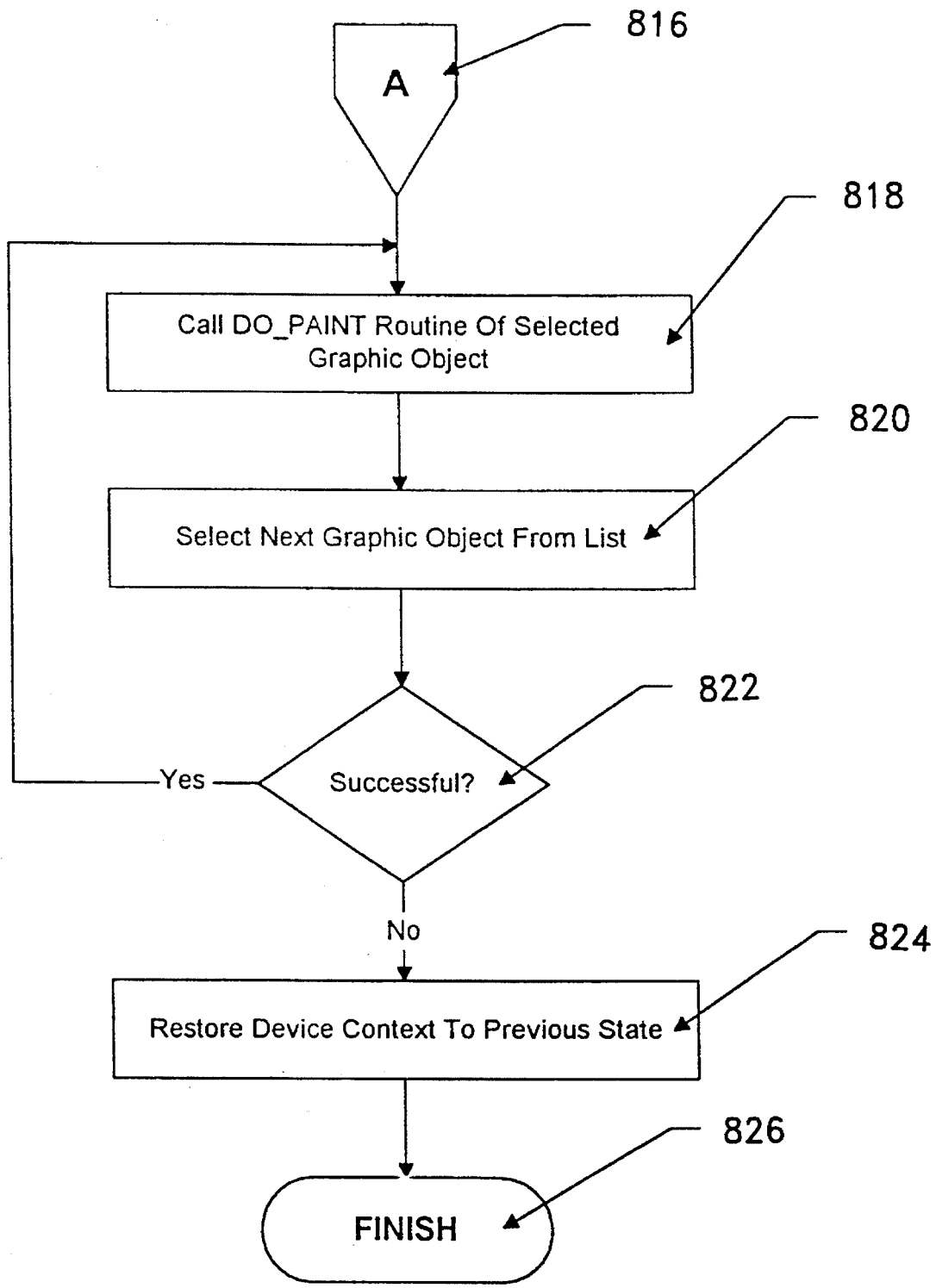

FIGS. 8A and 8B (when placed together) show a flowchart of an illustrative DO_PAINT routine which might be used by a graphic group object. The illustrative routine begins in step 800 and proceeds to step 802 where a check is made to determine whether the subject graphic group object is a "main" graphic group object (a "main" graphic group object is the object that is directly associated with a window); this check is made to determine how the viewport for the graphic object should be set.

As previously described in connection with the routine illustrated in FIG. 7, a window object generally sets the viewport variables in the device context so that the viewport extents match the window client area extents. If the graphic group object which is executing the routine shown in FIGS. 8A and 8B is a main graphic group, the viewport extents are already correctly set and need not be changed. Consequently, if the result of the decision step 802 is a "yes", the routine proceeds to step 808.

Alternatively, if, in decision step 802, it is determined that the subject graphic group object is not a main graphic group object, the routine proceeds to step 804 where the device context obtained by the window (as previously described in connection with FIG. 7) is further modified to set the viewport origin to the device equivalent of the graphic group rectangle origin. As previously mentioned, the redrawing of the graphic object will be performed with respect to the graphic object rectangle which has its own internal coordinates and origin and therefore, the viewport must be set correctly. Accordingly, the routine proceeds to step 806 in which the viewport extents are set to the rectangle extents of the rectangle associated with the graphic group object.

The routine then proceeds to step 808 in which the window origin is set to (0,0) and, in step 810, the window extents are set to the logical extents. This prepares the drawing routines to properly redraw the objects in the group.

In step 812, the first graphic object is obtained from the list of contained graphic objects associated with the graphic group object. The routine then proceeds, via off-page connectors 814 and 816 (FIG. 8B), to step 818 in which the DO_PAINT routine of the graphic object selected in step 812 is called to cause the graphic object to repaint itself within the previously-set viewport.

After the present graphic object has redrawn itself, an attempt is made to select the next graphic object from the group list as indicated in step 820. The selection attempt is checked for success in step 822. If the selection attempt was successful, the routine returns to step 818 and calls the DO_PAINT routine of the newly-selected graphic object.

Alternatively, if in step 822, it is determined that there are no remaining graphic objects on the list of contained objects, the routine proceeds to step 824 in which the device context, which was modified to set the appropriate viewport variables in steps 804–810, is returned to its previous state. In this manner, after the DO_PAINT routines for all of the component graphic objects are finished, the routine returns with the device context in a known state. This allows further processing by the window object, which originally called the DO_PAINT routine, to continue without resetting the device context. The routine then ends in step 826.

Figure 9:
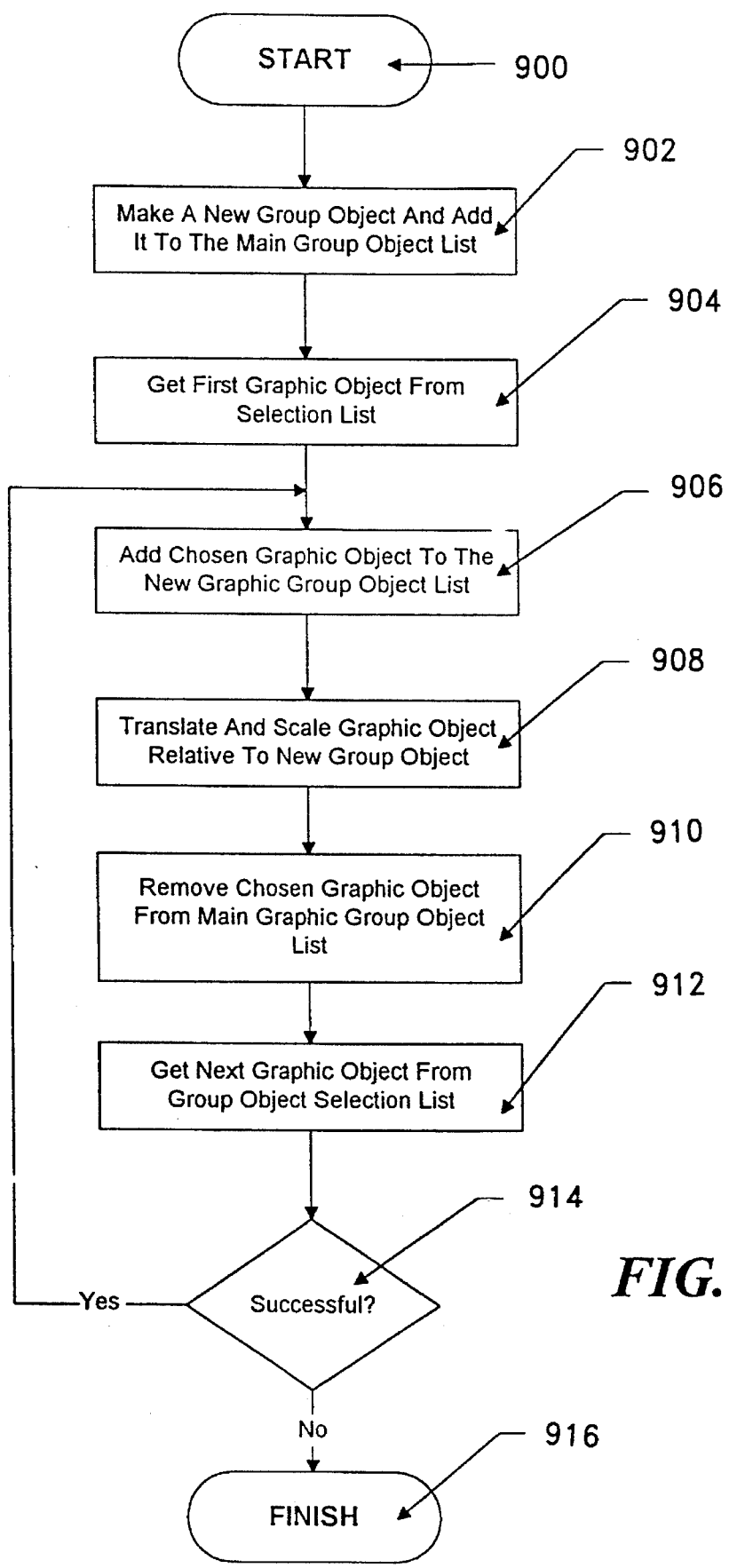
FIG. 9 is a flowchart of an illustrative routine used by a graphic group object to process a MAKE_GROUP message.

FIG. 9 shows a flowchart of an illustrative MAKE_GROUP routine which can be utilized by a window object to construct a new group object. The routine starts in step 900 and proceeds to step 902, in which a new group object is constructed and added to the main group object list. As previously mentioned, this construction is accomplished by calling the constructor function of the group object class. Such a function would typically return a pointer or a handle to the new group object. The pointer or a handle is then added to the main group object list.

In step 904, the first graphic object is obtained from a "selection list" which is constructed by the window object selection routines during the construction of a group. The routine then proceeds to step 906 in which the chosen graphic object is added to the new graphic group object list. In step 908, the image generated by the new graphic object is translated and scaled relative to the rectangle occupied by the new group object so that the newly-added component group object properly displays in the group rectangle display area. This translation and scaling is done according to straight-forward mathematical formulas which taken into account both the origin and extents of the original window in which the object was located, and the new origin and extents corresponding to the new group object rectangle. Step 908 insures that the selected graphic object displays properly in relationship to the new group.

In step 910, the chosen graphic object is removed from the main graphic group object by deleting its occurrence in the main group object list. From there, the routine proceeds to step 912 in which the next graphic object in the aforementioned selection list is obtained. If the attempt to obtain the next graphic object in step 912 is successful as determined by step 914, the routine then proceeds back to step 906 in which the new chosen graphic object is added to the new graphic group object list. Steps 908–912 are then repeated.

Alternatively, if, in step 914, it is determined that the attempt to obtain a new component graphic object from the selection list is not successful (due to the end of the list being reached), the routine finishes in step 916.

Figure 10:
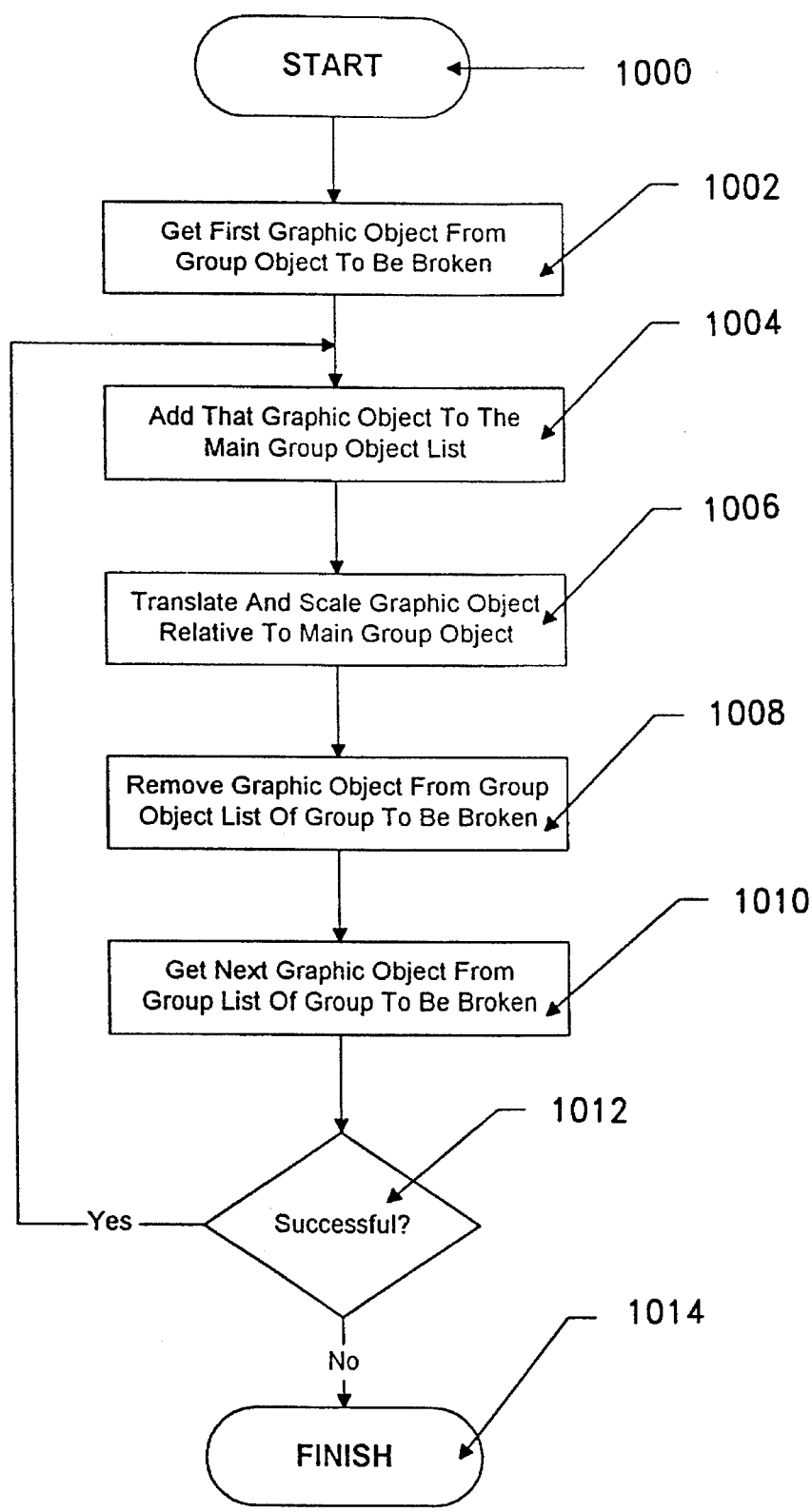
FIG. 10 is a flowchart of an illustrative routine used by a graphic group object to process a BREAK_GROUP message.

FIG. 10 is a flowchart of an illustrative routine which can be used by a window object to remove component graphic objects from a previously-constructed group (a BREAK_GROUP routine). The routine starts in step 1000 and proceeds to step 1002 in which the first component graphic object is obtained from the group to be broken. This is done by obtaining the component object pointer or handle from the component object list which is maintained within the group object. The routine then proceeds to step 1004 in which the graphic object obtained in step 1002 is added to the main group object list.

In step 1006, the image generated by the transferred graphic object is translated and scaled relative to the main group object to maintain its proper appearance when it is transferred from the group object to the main group object. As is done in the MAKE_GROUP routine, this translation and scaling is performed by comparing the origin and extents of the graphic group rectangle with the origin and extents of main group display area. In step 1008, the graphic object is removed from the group list of the group to be broken by deleting its pointer or handle from the group list.

In step 1010, an attempt is made to obtain another graphic object from the group list of the group to be broken and, if the attempt in step 1010 is successful, as determined in step 1012, the routine then proceeds back to step 1004 in which the new graphic object is added to the main group list and steps 1006–1010 are repeated.

Alternatively, if in step 1012, it is determined that the attempt to obtain the next graphic object is not successful, for example, due to the end of the list being reached, the routine finishes in step 1014.

Figure 11:
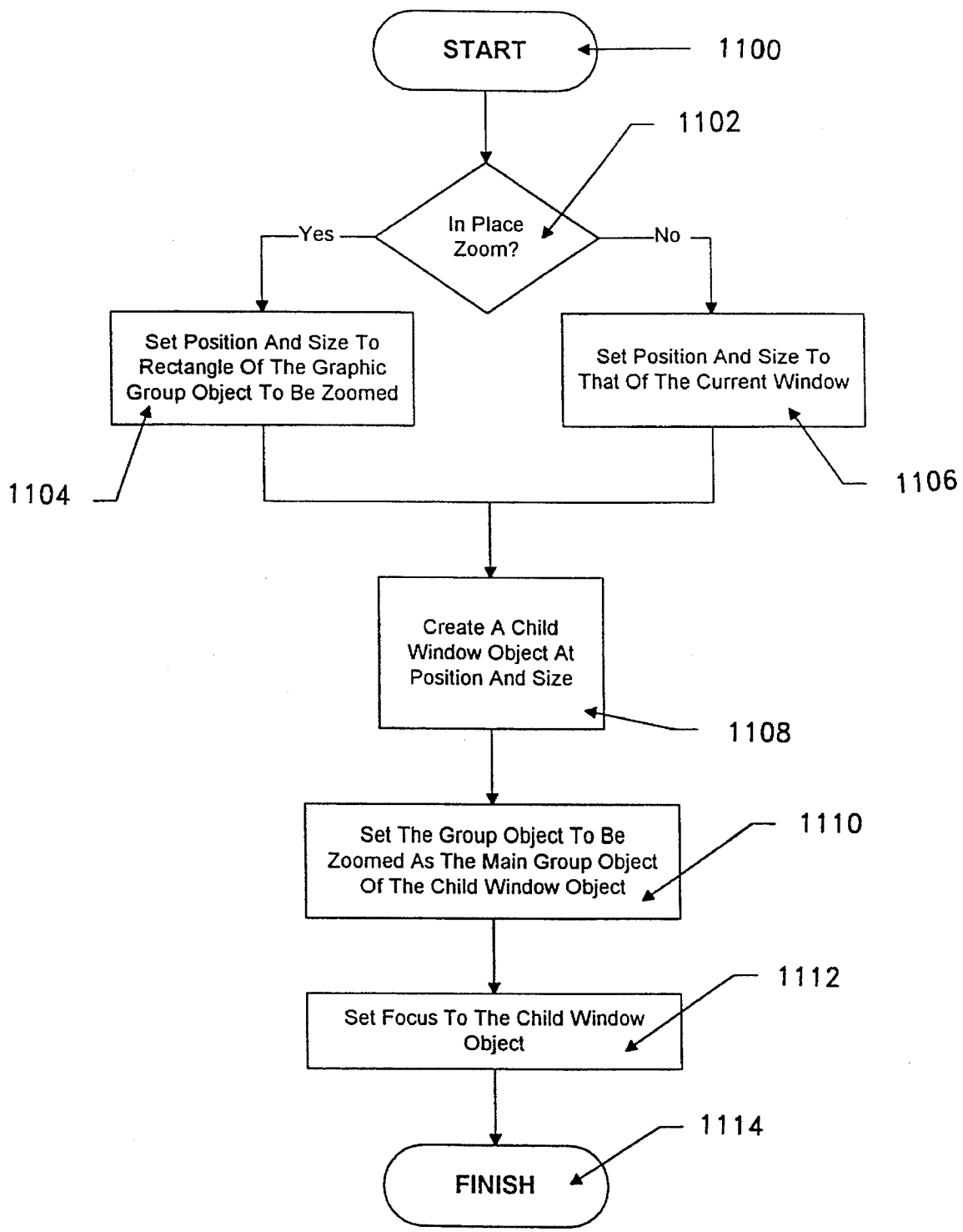
FIG. 11 is a flowchart of an illustrative routine used by a graphic group object to process a ZOOM message.

FIG. 11 illustrates, in accordance with the principles of the present invention, the processing of a ZOOM message by a window object. When the user wishes to "zoom" or "edit in place" an existing group as indicated by the appropriate menu command, button press or other typical command technique, a new window is created that is either the size of the original window (for a zoom command) or the same size as the original group rectangle (for an edit in place command). This new window is assigned the group object to be zoomed as the main group object associated with that window. As this new window is created with the same class as the original window, it can thus respond to all of the same graphic object manipulation commands as the original window. Since the group object in question is the main group of the new window, the component objects of this group can now be directly manipulated. This process of selecting group, creating a new window, and assigning the group as the main group of the new window can be repeated indefinitely for nested groups.

More particularly, the ZOOM routine starts in step 1100 and proceeds to step 1102 where it is determined whether a zoom command was received for an "edit in place" or for a "zoom" operation. As previously mentioned, an "edit in place" operation involves creating a new zoom window in the same position and with the same size as the graphic group rectangle corresponding to the graphic group to be edited. Alternatively, if a "zoom" operation is requested, the new zoom window is adjusted to the position and size of the window which is active at the time the zoom command is received.

Thus, in step 1102, a determination is made as to whether the command has been given to edit the graphic group object in place or not. If the graphic group object is to be edited in place, the routine proceeds to step 1104, where the position and size of the new zoom window which will be created are set to the rectangle size of the graphic group to be zoomed. Alternatively, if, in step 1102, it is determined that a zoom operation is to take place, then in step 1106, the position and size of the new editing window are set to those of the current window.

In either case, the routine proceeds to step 1108 in which a child window object is created at the position and with the size set in either step 1104 or step 1106. During this creation process WM_PAINT and WM_SIZE messages are sent by the WINDOWS operating system to the new child window, and, as previously described, these latter messages cause both the window and the objects within the window to be drawn with the correct location and size. In accordance with the principles of the invention, the new child window is created with the same type as the main window so that the editing commands which are applicable to the main window are also usable in the child window.

In step 1110, the group which is being zoomed is designated as the main group object of the newly-created child window object. This is done by copying the group list from the group object to be zoomed into the main group list of the new child window object. Thus, all of the objects contained within the editing window can be edited individually. The editing operation starts in step 1112 in which the input "focus" is set to the new child window object so that editing commands can be received by the new window. The routine then finishes in step 1114.

After editing of the selected graphic group object has been completed, editing control is returned to the parent window from which the zoom window was generated by means of an EXIT_ZOOM routine. More particularly, when a user is finished with the zoom or edit in place operations of a selected group object, the group object is returned to the original window object main group and the zoom window is destroyed. The original window object now contains the edited group as a component object of its main group but the component objects have the recent changes made.

Figure 12:
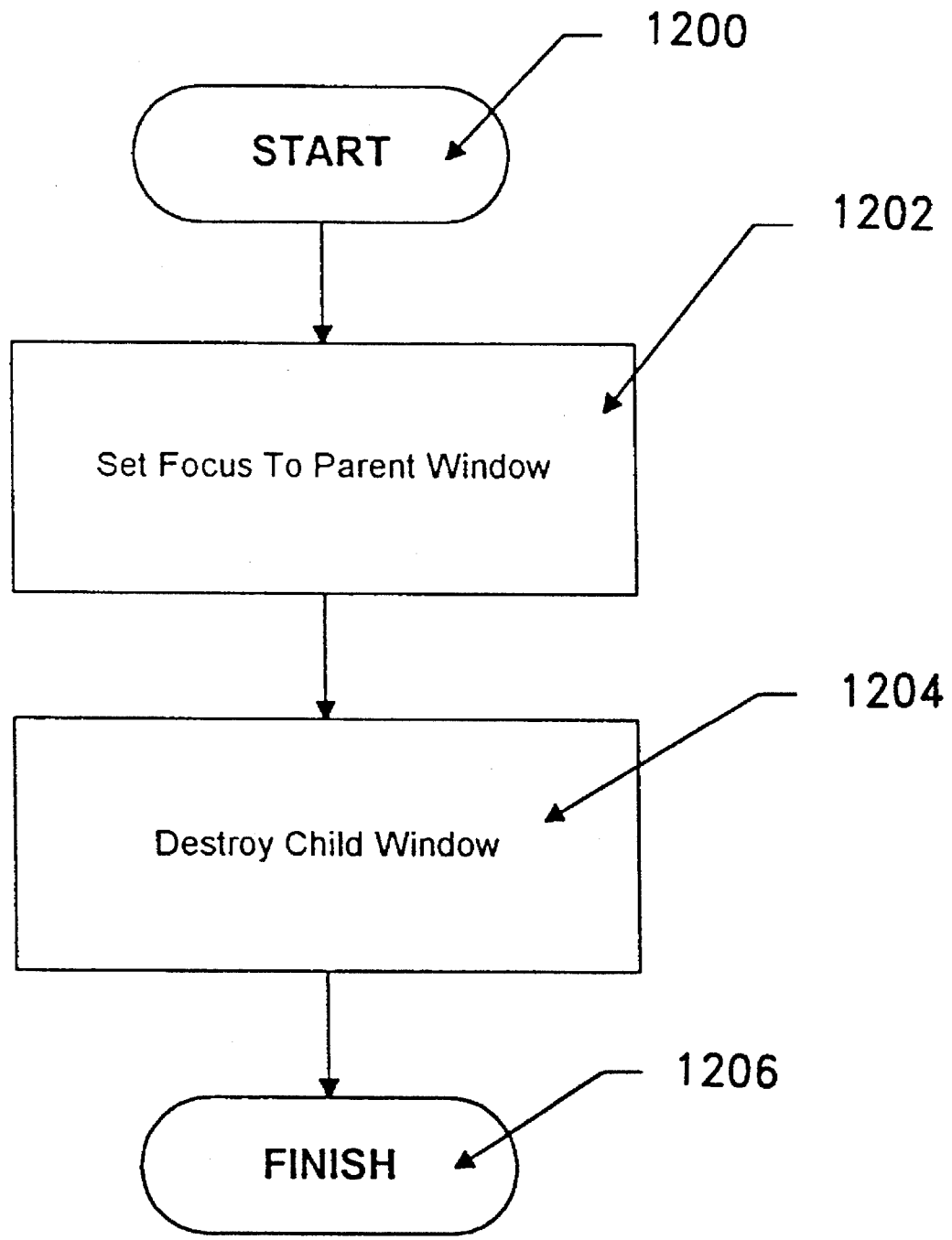
FIG. 12 is a flowchart of an illustrative routine used by a graphic group object to process an EXIT_ZOOM message.

The EXIT_ZOOM routine is shown in detail in FIG. 12 which is a schematic flowchart of the routine as executed by a window object. The routine starts in step 1200 and proceeds to step 1202 where the input focus is reset to the parent window. Since the group window list was copied from the parent window group list, the group still remains part of the parent window. Consequently, when the input focus is set to the parent window, a WM_PAINT message is issued by the WINDOWS operating system, causing all of the objects contained within the parent window to be redrawn. Since the objects within the group which has been modified have already been modified in the zoom window, when these objects redraw themselves, they will redrawn as they appeared in the zoom window, but scaled and translated so that they appear in the correct position and size in the parent window. However, since these objects are still listed as component objects in a group list in the parent window group list, they are still treated by the parent window as a group. Therefore, the component objects can be separately edited without requiring the objects to be "ungrouped."

Since the editing function is now finished, the child window which was created for editing purposes is destroyed in step 1204 and the routine finishes in step 1206.

The foregoing description has been limited to a specific embodiment of this invention. It will be apparent, however, that variations and modifications may be made to the invention, with the attainment of some or all of its advantages. For example, it will be obvious to those skilled in the art that the present invention can be used with various operating systems other than the WINDOWS system as disclosed. Therefore, it is the object of the appended claims to cover all such variations and modifications as come within the true spirit and scope of the invention.

What is claimed is:

1. Apparatus for use with a drawing program which edits and displays composite graphic images in a first editing and display area in response to a plurality of user commands, the apparatus modifying a group object in the first editing and display area, wherein said group object is formed from a group of interconnected component objects which are stored and recalled by the drawing program as said group object, the apparatus comprising:

a zoom display area generator responsive to one of the plurality of user commands for creating a second editing and display area;

a copy mechanism responsive to said group object for making each component object in said group object individually accessible in the second editing and display area at the same time;

an editor for individually modifying at least one component object in the second editing and display area and for displaying the component objects as an edited group object in the second editing and display area;

a return mechanism responsive to one of the plurality of user commands for redrawing said edited group object in the first editing and display area; and an exit mechanism for deleting the second editing and display area.

2. Apparatus according to claim 1, wherein the copy mechanism comprises a copier responsive to the group of component objects for copying each component object in the group from the first editing and display area to the second editing and display area.

3. Apparatus according to claim 1, wherein the copy mechanism comprises a copier responsive to the group of component objects for copying a pointer associated with each component object in the group from the first editing and display area to the second editing and display area.

4. Apparatus according to claim 1 wherein the drawing program uses the editor for editing images in the first editing and display area.

5. Apparatus according to claim 1 wherein the first and second editing and display areas are resizable and movable areas.

6. Apparatus according to claim 1, wherein the drawing program maintains a list of component objects forming the group object and the copy mechanism copies the list into the second editing and display area.

7. Apparatus for use with an object-oriented drawing program which creates and edits graphic objects which draw graphic images in a first editing and display area in response to a plurality of user commands, the apparatus modifying a group object which is formed from a group of interconnected component objects which are stored and recalled by the drawing program as said group object, the apparatus comprising:

a zoom display area generator responsive to one of the plurality of user commands for creating a second editing and display area;

a copy mechanism responsive said group object for making each component object in said group object individually accessible in the second editing and display area at the same time;

an editor for individually editing at least one component object in the second editing and display area and for redisplaying images drawn by the component objects in the second editing and display area;

a return mechanism responsive to one of the plurality of user commands for returning the component objects to the first editing and display area in order to redraw the component objects as an edited group object in the first editing and display area; and an exit mechanism for deleting the second editing and display area.

8. Apparatus according to claim 7 wherein the copy mechanism comprises a copier responsive to the group of component objects for copying each component object in the group from the first editing and display area to the second editing and display area.

9. Apparatus according to claim 7, wherein the copy mechanism comprises a copier responsive to the group of component objects for copying a pointer associated with each component object in the group from the first editing and display area to the second editing and display area.

10. Apparatus according to claim 7, wherein the object-oriented drawing program uses the editor for editing graphic objects which draw images in the first editing and display area.

11. Apparatus according to claim 7 wherein the first and second editing and display areas are resizable and movable areas.

12. Apparatus according to claim 7, wherein the object-oriented drawing program maintains a list of component objects forming the group object and the copy mechanism copies the list into the second editing and display area.

13. Editing apparatus for use with an object-oriented drawing program which operates in a WINDOWS environment and includes an editor which creates and edits graphic objects that draw composite graphic images in a first window in response to a plurality of user commands, the apparatus editing a group object formed from a group of interconnected component objects which are stored and recalled by the drawing program as said group object, the apparatus comprising:

a zoom window generator responsive to one of the plurality of user commands for creating a second window;

a copy mechanism responsive to said group object for making each component object in the group individually accessible in the second window at the same time where each component object can be edited with the editor;

a return mechanism responsive to one of the plurality of user commands for returning the component objects to the first window as an edited group object; and an exit mechanism for deleting the second window.

14. Apparatus according to claim 13, wherein the copy mechanism comprises a copier responsive to the group of component objects for copying each component object in the group from the first window to the second window.

15. Apparatus according to claim 13, wherein the copy mechanism comprises a copier responsive to the group of component objects for copying a pointed associated with each component object in the group from the first window to the second window.

16. Apparatus according to claim 13, wherein the object-oriented drawing program maintains a first list of graphic objects associated with the first window including the component objects forming the group object and the copy mechanism copies the first list into a second list associated with the second window.

17. Apparatus according to claim 16 wherein the component objects forming the group object are contained in a third list and the third list appears as a graphic object in the first list.

18. Apparatus according to claim 17 wherein the copy mechanism copies the third list into a second list associated with the second window.

19. A method for use with a drawing program which edits and displays graphic images in a first editing and display area in response to a plurality of user commands, the method modifying a group graphic object which is formed from a group of interconnected component objects which are stored and recalled by the drawing program as said group object, the method comprising the steps of:

A. creating a second editing and display area in response to one of the plurality of user commands;

B. making each component object in the group individually accessible in the second editing and display area at the same time;

C. individually modifying at least one component object in the second editing and display area with an editor;

D. displaying the component objects as a modified group graphic object in the second editing and display area;

E. redrawing said modified group graphic object in the first editing and display area; and F. deleting the second editing and display area.

20. A method according to claim 19, wherein step B comprises the step of:

B1. copying each component object in the group from the first editing and display area to the second editing and display area.

21. A method according to claim 19, wherein step B comprises the step of:

B2. copying a pointer associated with each component object in the group from the first editing and display area to the second editing and display area.

22. A method according to claim 19 further comprising the step of:

G. using the editor used in step C for editing images in the first editing and display area.

23. A method according to claim 19, wherein the drawing program maintains a list of component objects forming the group graphic object and step B comprises the step of:

B3. copying the list into the second editing and display area.

24. Apparatus for use with a drawing program which edits and displays composite graphic images in a first editing and display mode in response to a plurality of user commands, the apparatus modifying a group object in the first editing and display mode, wherein said group object is formed from a group of interconnected component objects which are stored and recalled by the drawing program as said group object, the apparatus comprising:

a copy mechanism responsive to said group object for making each component object in said group object individually accessible at the same time in a second editing and display mode;

an editor for individually modifying at least one component object in the second editing and display mode and for displaying the component objects as an edited group object; and a return mechanism responsive to one of the plurality of user commands for redrawing said edited group object in said first editing and display mode wherein said component objects edited as a group.

25. A method for use with a drawing program which edits and displays graphic images in a first editing and display mode in response to a plurality of user commands, the method modifying a group graphic object which is formed from a group of interconnected component objects which are stored and recalled by the drawing program as said group object, the method comprising the steps of:

making each component object in the group individually accessible at the same time in a second editing and display mode;

individually modifying at least one component object with an editor in said second editing and display mode;

displaying the component objects as a modified group graphic object in said second editing and display mode; and redrawing said modified group graphic object in said first editing and display mode wherein said component objects edited as a group.

\* \* \* \* \*